Dec. 26, 1933.  V. V. VEENSCHOTEN  1,940,829
FEED WATER REGULATOR
Filed Dec. 30, 1931   3 Sheets-Sheet 1

INVENTOR:
Vincent V. Veenschoten
By E. J. Andrews
Atty.

Dec. 26, 1933.  V. V. VEENSCHOTEN  1,940,829
FEED WATER REGULATOR
Filed Dec. 30, 1931   3 Sheets-Sheet 2

INVENTOR
Vincent V. Veenschoten
BY
ATTORNEY

Dec. 26, 1933.  V. V. VEENSCHOTEN  1,940,829
FEED WATER REGULATOR
Filed Dec. 30, 1931   3 Sheets-Sheet 3

INVENTOR
Vincent V. Veenschoten
BY
ATTORNEY

Patented Dec. 26, 1933

1,940,829

UNITED STATES PATENT OFFICE 1,940,829

FEED WATER REGULATOR

Vincent V. Veenschoten, Erie, Pa., assignor to Northern Equipment Company, Erie, Pa., a corporation of Pennsylvania Application December 30, 1931. Serial No. 583,914

20 Claims. (Cl. 122—451.2)

This invention relates to feed water regulators, the object of which is to supply water to boilers and the like, in accordance with the rate of flow of steam from the boiler, and according to variations in the boiler water level elevation; and to provide compensating means affected by the flow of water; and to provide various other compensating and adjusting means in order to maintain the water level substantially constant or within such limits as may be desired. The invention contemplates the use of diaphragm and hydraulic means for controlling the flow of water to the boiler, and one of the objects has been to dispense not only with the ordinary thermostat or float means, but also to dispense with the use of levers or similarly moving parts, so as to materially decrease the complications of the system.

Figure 1:
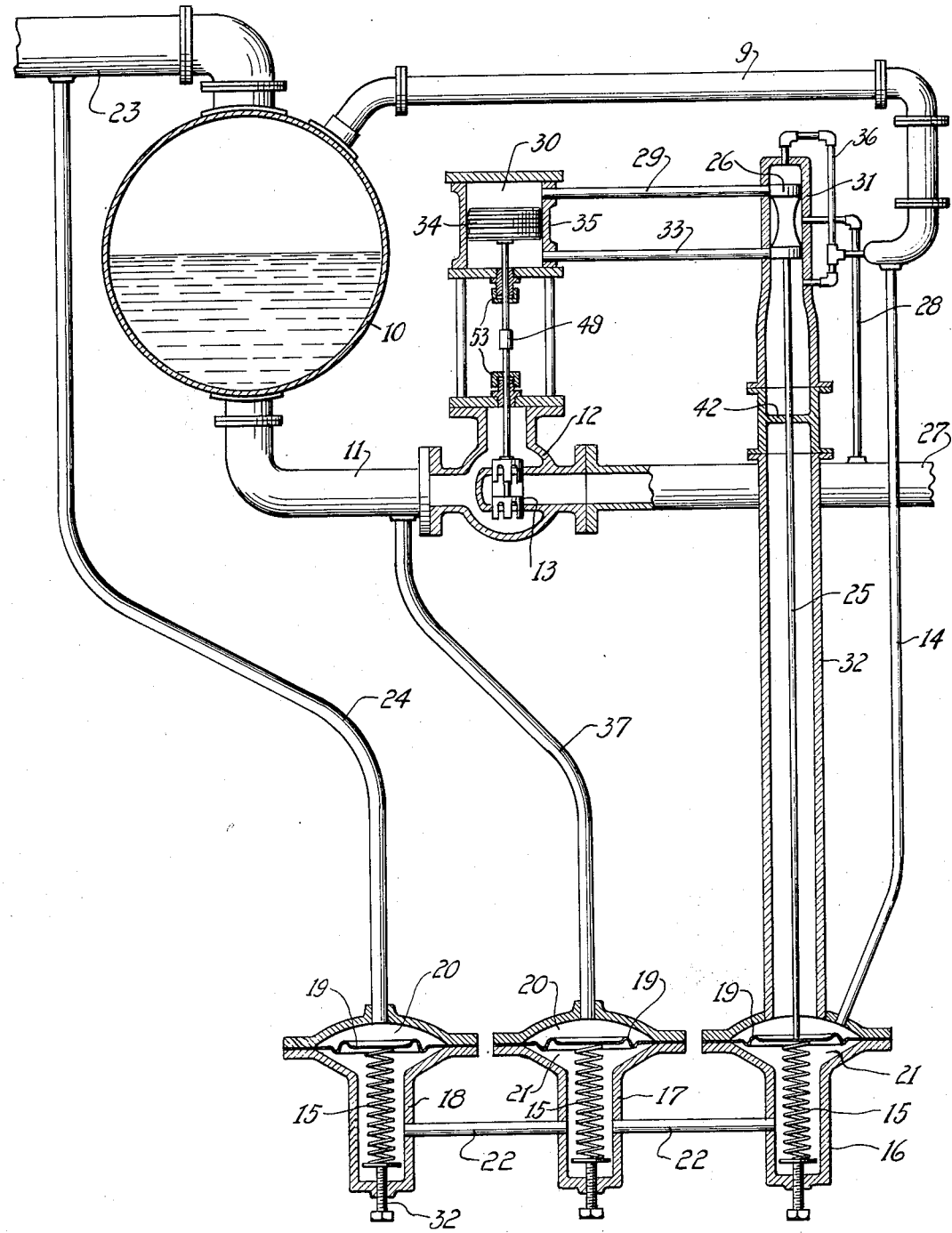
Figure 2:
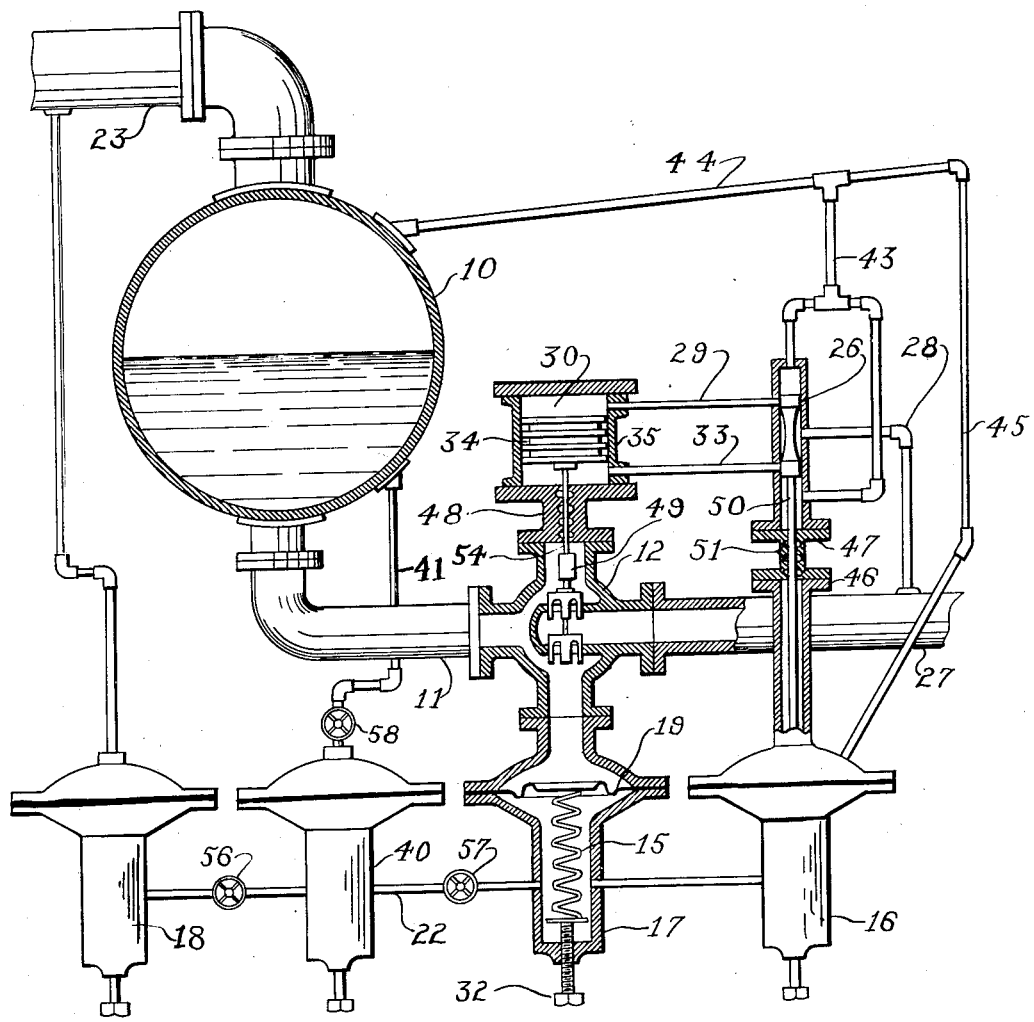
Figures 3, 4:
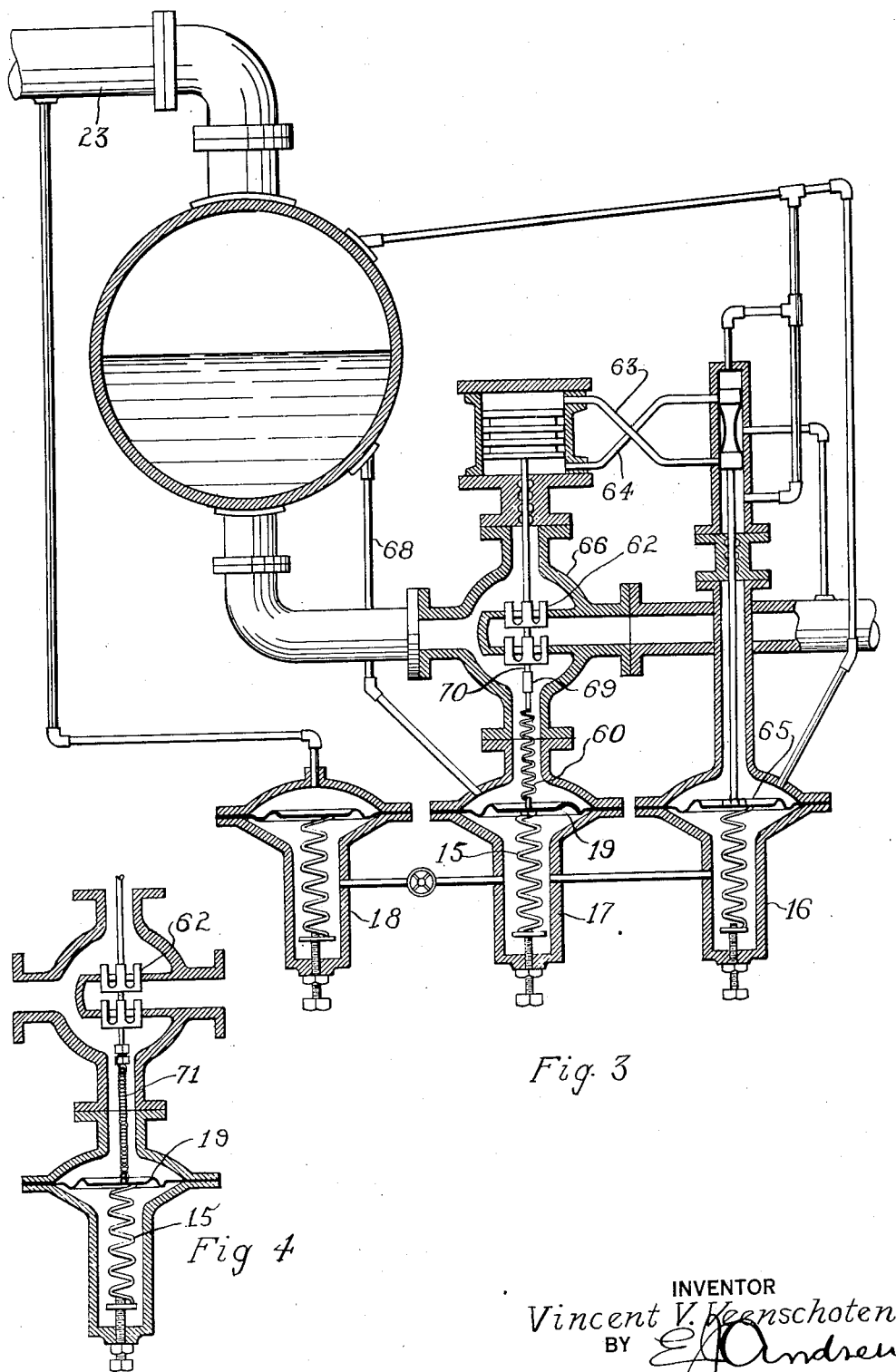

Of the accompanying drawings, Fig. 1 is a more or less diagrammatic sectional elevation of a boiler system and the means for regulating the flow of water thereto; Fig. 2 is a sectional elevation of a modified form of the feed water regulator system; Figs. 3 and 4 show modifications of the system.

In the operation of many modern boilers, it is desired to operate the boiler system at very high steam pressures, and often at capacities far beyond the normal rated capacity; also often with very material and sudden changes in load or in fire intensity. In such cases, the control of the water level elevation in the boiler must be according to the various needs and, hence, under very sensitive control, particularly so as to prevent abnormally high or low levels, and in order to avoid flooding or emptying the boiler inadvertently. For these purposes, the system which I will illustrate and describe herein is particularly applicable.

With the feed water system, it is now customary to have means responsive to the variations in the steam flow from the boiler for controlling the flow of water to the boiler; the aim being ordinarily to maintain substantially equal the mass of water and steam flowing into and from the boiler. It has been common in the past to provide such water flow control means by the use of thermostatic tubes, floats, or the like. In this case, I provide such means by the use of hydraulic means associated with the feed water valve operating mechanism.

The boiler 10 is supplied with water through the pipe 11, the flow being controlled by the feed water valve 12 by means of the plunger 13. The water is supplied through the pipe 27 from any suitable source of supply under suitable pressure. The plunger 13 is ordinarily operated by the operating means so as to supply water to the boiler at a rate substantially equal to the rate of flow of steam from the boiler. The apparatus for supplying water at this rate is responsive directly to the rate of flow of steam.

This apparatus comprises a pipe 24 which is directly or indirectly connected to the steam main 23 of the boiler. This pipe is connected also to a container 18 having a chamber 20. In this chamber is mounted a diaphragm 19 and, beneath this diaphragm is, preferably, mounted a spring 15. The compression of this spring on the diaphragm 19 is adjustable by means of a screw 32. The container 18 is connected by a pipe 22 directly or indirectly to a container 16. In this container 18 also is mounted a diaphragm 19, backed by spring 15. The upper portion of the container 16 is connected by pipes 14 and 9 to the steam space of the boiler. The pipe 24 and the pipe 14 and the vertical portion of the pipe 9 will, in operation, be full of water which will condense from the steam contained therein.

As a consequence of this arrangement, it will be seen that the diaphragms in the two containers 18 and 16 will be under the influence of the steam and water pressures and the spring pressures. The chambers beneath the diaphragms, however, are filled with oil or other suitable liquid, so that fluid pressure can be freely transmitted from one container to the other. As a consequence of this, the two diaphragms will take positions of equilibrium, depending upon the various pressures and, if the pressure in either container varies, the relative elevations of the diaphragms will vary accordingly.

When the steam flow from the boiler is uniform, the two diaphragms will assume a definite relation with reference to each other. If, however, the steam flow is increased by varying the opening of the throttle valve to the turbine or other apparatus, the pressure in the pipe 23 will decrease with reference to the pressure in the boiler, and the diaphragm 19 in the container 18 will be forced upwardly somewhat by the excess pressure in the container 16.

The diaphragm in the container 16 is connected, by means of a rod 25, with a pilot valve 26. This pilot valve is mounted in a casing 31 which is connected by means of a pipe 28 with the feed water supply pipe 27. The casing 31 is also connected, by means of pipes 29 and 33, to a hydraulic cylinder 35, in which is mounted a piston 34. The arrangement is such that, when the diaphragm in the container 16 is forced downwardly by the excess pressure, it will carry with it the pilot valve 26. The water from the supply pipe will then flow through the pipes 28 and 33 to the lower end of the chamber 30 of the cylinder 35. And the increased pressure thus produced in the chamber below the piston will force the piston upwardly and open more the valve 12. The water in the upper end of the chamber 30 will be forced outwardly through the pipe 29 and the pipe 36 into the pipe 9, as the downward movement of the pilot valve will open the outlet of the pipe 29.

However, when the pilot valve sinks, allowing increased pressure below the piston 34, it is obvious that the piston will be forced upwardly until the valve 12 is completely opened, unless means are provided for preventing this. The means which I provide for this purpose comprises the container 17 having a chamber 20 therein, in which is mounted a diaphragm 19 backed by a spring 15. The container 17 is also connected by a pipe 22 to the lower end of the container 16 and the chamber 20 of the container is connected by a pipe 37 with the water supply pipe 11.

When the plunger 13 is elevated so as to open more the valve, increasing the flow of water therethrough, the water pressure in the pipe 11 and also in the pipe 37 will be increased and this increase in pressure will force downwardly the diaphragm in the container 17, thus forcing upwardly the diaphragm in the container 16. This, in turn, will force upwardly the pilot valve 26, thus closing the inlet to the pipe 33 and preventing further movement of the piston 34. If the various elements are properly designed and arranged relative to each other, the compensating effect of the container 17 will close the inlet to the pipe 33 at a suitable position of the plunger 13 to provide increased flow of water substantially equal to the increased flow of steam from the boiler.

It will be understood that this entire process will be reversed when the throttle valve of the steam main is closed more so as to decrease the load on the boiler. In such a case, the pressure in the pipe 24 will be increased, the diaphragm in the container 18 will be forced downwardly, the diaphragm in the container 16 will be forced upwardly, and this will open the inlet to the pipe 29, allowing the pressure above the piston to force the piston downwardly and close more the valve 12.

In the ordinary operation of steam boiler systems of this nature, means are provided to prevent abnormal variations in the water level elevation in the boiler. Such means ordinarily are directly responsive to the variations in the water level. The means which I have described are also responsive to such water level variations. While the position of the diaphragm in the container 17 is affected by variations in pressure in the pipe 11, owing to variations in the opening of the valve 12, it is also affected by variations in the water level elevation in the boiler. Any increase in the elevation of the water level will increase the pressure in the pipes 11 and 37. As a consequence, the diaphragm in the container 17 will be forced downwardly. This will force upwardly the diaphragm in the container 16 and also the pilot valve 26, thus closing more the valve 12. Over-running of the valve is prevented ultimately by the decrease in water level in the boiler.

It will thus be seen that I have provided means for normally varying the inflow of water to the boiler substantially in accordance with the variations in flow of steam therefrom, and that suitable means are provided for preventing over-running of the plunger of the feed water valve, so that the movement of this valve will be prevented beyond the change necessary to provide for the change in flow of water required. At the same time, I have provided means whereby abnormal variations in the water level may be prevented, it being understood that such variations would otherwise result by virtue of leakage or blowing down of the boilers or otherwise, even though the inflow of water were exactly equal to the outflow of water as steam.

In Fig. 2, I have illustrated a modified form of feed water regulator system, in which the containers 16, 17 and 18 are used substantially as described with reference to Fig. 1 but, in addition, I have inserted the container 40, which is similar to the others except that the upper end thereof is connected to the water space of the boiler by means of the pipe 41. By this arrangement, the container 40 is directly responsive to variations in water level in the boiler. When the water level rises, the effect will be to force downwardly the diaphragm in the container 40 and, thus, to force upwardly the diaphragm in the container 16, so as to close more the valve 12.

This system differs from the other also in that the container 17 is directly connected to the casing 12, so that the diaphragm therein is directly responsive to variations in pressure in the outlet of the valve 12. Obviously, the effect thereof will be substantially the same as if the container were connected to the pipe 11, as in case of Fig. 1. By this arrangement, both of the containers 17 and 40 are responsive to variations in water level elevation in the boiler, so that such variations produce substantially a double effect on the diaphragm in the container 16.

When the piston 34 is operated and the water is forced out from the chamber 30 into the pipe 9 of Fig. 1, the flow of water through this pipe, owing to the friction thereof, tends to produce a back pressure which is transmitted to the diaphragm of the container 16 through the pipe 14 and also through the pipe 32. To reduce this effect, I provide a partition 42 in the pipe 32, through which the rod 25 passes snugly. Also, I increase materially the size of the pipe 9, thus reducing the effect of the friction therein on the diaphragm.

However, as neither of these provisions entirely eliminates the effect of this friction, I prefer to eliminate it entirely by the method illustrated in Fig. 2. In this case, the water from the chamber 30 is forced into the pipe 43 and then into the pipe 44. As this pipe 44 inclines downwardly to the boiler, it is continuously full of steam and, hence, there is no friction effect that is transmitted through the pipe 45 back to the container 16. In the pipe 46 also, I insert the guide member 47. This member has a long passageway in which the rod 50 snugly moves, and in the passageway are annular grooves 51 which tend to decrease the leakage. In this manner, the effect of the flow of water from the chamber 30 is made negligible, so far as the diaphragm of the container 16 is concerned.

Also, in this system, I dispense with the stuffing boxes 53 of the other system. The base of the hydraulic cylinder 35 is connected, by means of a guide member 48, with the casing of the valve 12. The valve stem 54 passes through the snugly fitting passageway of the guide member to the piston. As the difference in pressure between the chamber 30 and the valve outlet is not great, the leakage through the passageway is immaterial.

In order to adjust the position of the valve plunger with reference to the piston in either system, I provide a coupling 49 threaded onto one section of the valve stem and fixed to the other section. By turning either section of the stem relative to the other section, the valve plunger may be raised or lowered.

Either of these regulator systems may be used without the steam flow responsive means by eliminating the container 18. The system then becomes a water level responsive system only, except as it is affected by variations in water flow. By closing the valve 56 or 58, the container 18 or 40 may be temporarily or permanently eliminated. Eliminating the container 40 will materially reduce the effect of the water level variations. Or, by varying the openings of the valve 56 or 57 or 58, the lag in the effect of the container 18 or 40 may be varied accordingly. Closing the valve 57 more will delay the effect of the container 40 and, thus, increase the range in water level elevations in the boiler.

With either of these systems, variations in steam pressure in the boiler have little or no effect on the feeding of water to the system. The relative positions of the diaphragms depend upon relative differences in pressure on the diaphragm, and the relative difference is substantially unchanged by changes in the boiler pressure. Also, difference in pressures in the supply pipe 27 are cared for. As the pressure increases, the diaphragm in the container 17 will be forced downwardly, and this will force upwardly the diaphragm in the container 16 and will close somewhat the valve. So that the inflow of water will not be appreciably increased.

In case of Fig. 3, the arrangement is somewhat similar to the other figures and the general principle of operation is the same. In this case, however, a compression spring 60 is inserted between the diaphragm 19 and the valve plunger 62. Also, the plunger 62 is inverted so that it closes as it moves upwardly. This is produced by reversing the pipes 63 and 64 with reference to the arrangement of the pipes 29 and 33 of Fig. 2.

In operation, assuming a reduction in the flow of steam through the pipe 23, the increased pressure in the container 18 will force the liquid into the container 16 and, thus, force upwardly the diaphragm 65 and pass fluid pressure into the pipe 64, thus closing more the feed water valve 66. As the plunger 62 is forced upwardly, the compression on the spring 60 will be decreased. This will allow the spring 15 to force upwardly the diaphragm 19 and will thus allow the liquid from the container 16 to pass into the container 17, closing the inlet to the pipe 64 and stopping the movement of the plunger 62.

In this case, the container 40 is omitted and the container 17 is connected by the pipe 68 to the water space of the boiler. Also, a coupling 69 is provided for varying the length of the stem 70 of the plunger 62 so as to vary the compression of the spring 60 as may be desired by the particular conditions.

Fig. 4 is a slight modification of Fig. 3, in which the spring 60 is replaced by the tension spring 71. This spring thus assists the spring 15, and, as the plunger 62 moves upwardly, it will be more effective in assisting the spring 15 and, hence, the springs, as the plunger 62 moves upwardly, will be able to force the diaphragm upwardly and allow the liquid to flow from the container 16 to the container 17 and stop the movement of the valve.

I claim as my invention:

1. In a boiler system having a steam main and a water supply pipe, a feed water regulator system comprising a valve mounted in said pipe and means for varying the opening of said valve, said means comprising a first and a second container, each container having a chamber therein, and a flexible diaphragm dividing each chamber into an upper and a lower compartment, a pipe providing communication between the lower compartments, a liquid filling said pipe and each lower compartment, means providing communication between the upper compartment of the first container and the steam space of the boiler of said system, means providing communication between the upper compartment of the second container and the steam main, and means operatively associating the diaphragm in said first container with said valve.

2. In a boiler system as claimed in claim 1, a third container similarly divided into two compartments by a diaphragm, the lower compartment being in communication with the lower compartment of the first container, and the upper compartment being in communication with the supply pipe between said valve and the boiler.

3. In a boiler system as claimed in claim 1, a third and a fourth container each similarly divided into two compartments by a diaphragm, the lower compartments being in communication with the lower compartment of the first container, the upper compartment of the third container being in communication with the supply pipe between said valve and the boiler, and the upper compartment of the fourth container being in communication with the water space of the boiler.

4. In a boiler system having a steam main and a water supply pipe, a feed water regulator system comprising a valve mounted in said pipe and means for varying the opening of said valve, said means comprising a first and a second container, each container having a chamber therein, and a flexible diaphragm dividing each chamber into an upper and a lower compartment, a pipe connecting the lower compartments, a liquid filling the pipe and the lower compartments, the upper compartment of said first container being in communication with the steam space of the boiler, and the upper compartment of said second container being in communication with the supply pipe between the valve and the boiler, and means operatively associating the diaphragm of said first container with said valve.

5. In a boiler system having a steam main and a water supply pipe, a feed water regulator system comprising a valve mounted in said pipe and means for varying the opening of said valve, said means comprising a first and a second container, each container having a chamber therein, and a flexible diaphragm dividing each chamber into a lower and an upper compartment, the lower compartments containing a fluid, the upper compartment of said first container being in communication with the steam space of the boiler, the upper compartment of the second container being in communication with the water space of the boiler, means for preventing over-running of said valve when operated by the diaphragm of the first container, and means operatively associating the diaphragm of the first container with said valve.

6. In a boiler system as claimed in claim 1, means for preventing over-running of said valve when set in operation by the diaphragm of said first container.

7. In a boiler system as claimed in claim 1, each of said containers having a spring mounted therein and tending to force said diaphragm upwardly.

8. In a boiler system having a steam main and a water supply pipe, a feed water regulator system comprising a valve mounted in said pipe and means for varying the opening of said valve, said means comprising a container, said container having a chamber therein and a diaphragm dividing said chamber into an upper and a lower compartment, said diaphragm being responsive to variations in the pressure in said steam main, a casing in communication with the upper compartment, a hydraulic cylinder, a piston in said cylinder operatively connected with said valve, a pilot valve operatively connected with said diaphragm and mounted in said casing for allowing liquid under pressure to pass into said cylinder and from said cylinder to said casing, and a pipe connecting the upper compartment with the steam space of the boiler, said casing being in communication with said pipe.

9. In a boiler system as claimed in claim 8, the portion of said pipe in communication with the casing slanting downwardly towards said boiler.

10. In a boiler system having a steam main and a water supply pipe, a feed water regulator system comprising a valve mounted in said pipe and means for varying the opening of said valve, said means comprising a first and a second container, each container having a chamber therein, and a diaphragm dividing each chamber into an upper and a lower compartment, a pipe providing communication between the lower compartments, a liquid filling said pipe and each lower compartment, means providing communication between the upper compartment of the first container and the steam space of the boiler of said system, means providing communication between the upper compartment of the second container and the steam main, and means operatively associating the diaphragm in one of said containers with said valve.

11. In a boiler system having a steam main and a water supply pipe, a feed water regulator system comprising a valve mounted in said pipe and means for varying the opening of said valve, said means comprising a first and a second container, each container having a chamber therein, and a diaphragm dividing each chamber into an upper and a lower compartment, a pipe connecting the lower compartments, a liquid filling the pipe and the lower compartments, the upper compartment of said first container being in communication with the steam space of the boiler, and the upper compartment of said second container being in communication with the supply pipe, and means operatively associating the diaphragm of one of said containers with said valve.

12. In a boiler system having a steam main and a water supply pipe, a feed water regulator system comprising a valve mounted in said pipe and means for varying the opening of said valve, said means comprising a container having a chamber therein, a flexible diaphragm dividing said chamber into an upper and a lower compartment, means containing fluids under pressure connecting the upper compartment with the steam space of the boiler, fluid containing means connecting the lower compartment with the water supply pipe, said diaphragm being operatively associated with the said valve.

13. In a boiler system having a steam main, and a water supply pipe with a feed water valve therein, means for controlling the opening of said valve, said means comprising a container full of liquid having therein a movable member operatively associated with said valve, the container being connected by fluid containing means with the steam space of the boiler and also with the supply pipe, whereby the position of said member is responsive to variations in the relative pressures in said boiler and pipe.

14. In a boiler system having a steam main and a water supply pipe, a feed water regulator system comprising a valve mounted in said pipe and means for varying the opening of said valve, said means comprising a liquid container in operative communication with the steam main and the steam space of the boiler of the system, said container having a liquid therein the upper surface of which is operatively associated with the valve, and its elevation being responsive by virtue of said means to the relative steam pressures in the boiler and main, and said surface elevation also being responsive to the movement of the valve.

15. In a boiler system having a steam main and a water supply pipe, a feed water regulator system comprising a valve mounted in said pipe and means for varying the opening of said valve, said means comprising two containers, each container having a chamber therein, a diaphragm dividing each chamber into two compartments, a pipe providing communication between the lower compartments, a liquid filling said pipe and each lower compartment, means providing communication between the upper compartment of one container and the steam space of the boiler of said system, means providing communication between the upper compartment of the other container and the steam main, and means operatively associating the diaphragm in one of said containers with said valve, said diaphragm being responsive to the movement of the valve.

16. In a boiler system, a feed water valve for the boiler, two liquid containers each having a chamber with a diaphragm dividing it into two compartments, the lower compartments being filled with a liquid and being in communication with the other lower compartments, operative means associating each diaphragm with the plunger of the valve, one arranged to move the plunger and the other arranged to be moved by the plunger, one of the upper compartments being in communication with the steam space of the boiler and the other with the water space of the boiler.

17. In a boiler system as claimed in claim 16, each diaphragm having yielding means tending to force the diaphragm upwardly.

18. In a boiler system as claimed in claim 16, each diaphragm having yielding means tending to force the diaphragm upwardly, and the means arranged to move the diaphragm comprising a spring operatively connected with the plunger and the diaphragm.

19. In a boiler system as claimed in claim 16, each diaphragm having yielding means tending to force the diaphragm upwardly, and the means arranged to move the diaphragm comprising a spring operatively connected with the plunger and the diaphragm, said spring tending to force the diaphragm downward.

20. In a boiler system as claimed in claim 16, each diaphragm having yielding means tending to force the diaphragm upwardly, and the means arranged to move the diaphragm comprising a spring operatively connected with the plunger and the diaphragm, said spring tending to force the diaphragm upward.

VINCENT V. VEENSCHOTEN.